United States Patent

Inoue

(10) Patent No.: US 9,323,507 B2
(45) Date of Patent: Apr. 26, 2016

(54) OPTIMIZATION APPARATUS, OPTIMIZATION METHOD AND OPTIMIZATION PROGRAM

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 69 days.

(21) Appl. No.: 13/886,840

(22) Filed: May 3, 2013

(65) Prior Publication Data

US 2013/0305230 A1 Nov. 14, 2013

(30) Foreign Application Priority Data

May 8, 2012 (JP) ................................. 2012-106908

(51) Int. Cl.
*G06F 9/45* (2006.01)
*G06F 9/455* (2006.01)
*G06F 11/36* (2006.01)

(52) U.S. Cl.
CPC ............. *G06F 8/443* (2013.01); *G06F 9/4552* (2013.01); *G06F 11/3636* (2013.01); *G06F 11/3676* (2013.01); *G06F 11/3684* (2013.01); *G06F 11/3608* (2013.01)

(58) Field of Classification Search
None
See application file for complete search history.

(56) References Cited

U.S. PATENT DOCUMENTS

| 6,161,217 | A | 12/2000 | Detlefs et al. |
| 6,170,083 | B1 * | 1/2001 | Adl-Tabatabai ............ 717/158 |
| 6,175,956 | B1 | 1/2001 | Hicks et al. |
| 6,182,283 | B1 * | 1/2001 | Thomson ................ G06F 9/443 712/E9.084 |
| 6,219,825 | B1 * | 4/2001 | Burch .................... G06F 8/4442 717/158 |
| 6,658,657 | B1 * | 12/2003 | Lueh ...................... G06F 9/443 712/E9.084 |
| 6,662,362 | B1 * | 12/2003 | Arora ................... G06F 11/3612 714/E11.209 |
| 6,886,155 | B2 * | 4/2005 | Hasha ........................ 717/116 |
| 7,363,621 | B2 * | 4/2008 | Takeuchi ................ G06F 8/443 712/E9.082 |
| 7,383,533 | B2 * | 6/2008 | Hasha ........................ 717/116 |
| 7,496,908 | B2 * | 2/2009 | DeWitt et al. ................ 717/158 |
| 7,503,039 | B2 * | 3/2009 | Inoue et al. ................. 717/154 |

(Continued)

OTHER PUBLICATIONS

Inoue et al., A Trace-based Java JIT Compiler Retrofitted from a Method-based Compiler, published by IEEE, 2011, pp. 246-256.*

(Continued)

*Primary Examiner* — Tuan Q. Dam
*Assistant Examiner* — Zheng Wei
(74) *Attorney, Agent, or Firm* — Tutunjian & Bitetto, P.C.; Jennifer R. Davis

(57) ABSTRACT

An optimization apparatus includes an insertion unit inserting a method test for each of the virtual methods included in a code sequence, an acquisition unit acquiring one or more profiled run-time classes of a receiver object used for calling each of the virtual methods at execution of the code sequence into which the method tests have been inserted, and an optimization unit inserting, in place of the inserted method test, a class test that sets a recording-time class and the run-time class of a corresponding receiver object as classes to be permitted on condition that the run-time class of the corresponding receiver object has successfully called all virtual methods requesting the method test for the receiver object.

16 Claims, 16 Drawing Sheets

(56) References Cited

U.S. PATENT DOCUMENTS

| | | | | |
|---|---|---|---|---|
| 7,526,760 | B1* | 4/2009 | Daynes | G06F 9/443 712/234 |
| 7,661,098 | B2* | 2/2010 | Sheikh | G06F 8/443 717/148 |
| 7,694,281 | B2* | 4/2010 | Wang et al. | 717/128 |
| 7,698,697 | B2* | 4/2010 | Grcevski et al. | 717/151 |
| 7,716,657 | B2 | 5/2010 | Inglis et al. | |
| 7,725,885 | B1* | 5/2010 | Pradhan et al. | 717/148 |
| 7,793,277 | B2* | 9/2010 | Schmidt | 717/158 |
| 7,979,852 | B2* | 7/2011 | Bodin | G06F 8/443 717/150 |
| 8,245,210 | B2* | 8/2012 | Ng | G06F 8/443 717/140 |
| 8,429,632 | B1* | 4/2013 | Coutant | G06F 11/362 717/124 |
| 8,522,222 | B2* | 8/2013 | Tillmann | 717/148 |
| 8,549,498 | B2* | 10/2013 | Hayashizaki et al. | 717/148 |
| 8,578,352 | B1* | 11/2013 | Mitrovic | G06F 9/4552 717/140 |
| 8,756,581 | B2* | 6/2014 | Castanos et al. | 717/128 |
| 8,769,511 | B2* | 7/2014 | Gal et al. | 717/148 |
| 8,782,623 | B2* | 7/2014 | Inglis | G06F 8/4443 717/148 |
| 2002/0112227 | A1* | 8/2002 | Kramskoy et al. | 717/148 |
| 2011/0088016 | A1* | 4/2011 | Ball et al. | 717/128 |

OTHER PUBLICATIONS

Hayashizaki et al., Improving the Performance of Trace-based Systems by False Loop Filtering, puglished by ASPLOS'11, Mar. 5-11, pp. 405-418.*

Inoue et al., Adaptive Multi-Level Compilation in a Trace-based Java JIT Compiler, published by OOPSLA'12, ACM 2012, pp. 1-15.*

Toshio Suganuma, Design and Evaluation of Dynamic Optimizations for a Java Just-In-Time Compiler, published Jul. 2007, pp. 1-133.*

Holzle, U., et al. "Optimizing Dynamically-Typed Object-Oriented Languages With Polymorphic Inline Caches" ECOOP '91 proceedings, Springer Verlag Lecture Notes in Computer Science 512. Jul. 1991. pp. 1-18.

* cited by examiner

Figure 3

DEFINITIONS OF METHODS FOR CLASSES
*superClass* → methodA methodB
*childClass0* → methodA (inherited) methodB (inherited)
*childClass1* → *methodA'* (overridden) methodB (inherited)
*childClass2* → methodA (inherited) *methodB'* (overridden)

```
if (obj->class==superClass or childClass0)
  CONTINUE ;
else
  END;
```
⌠500

```
if (objX->class==superClass or childClass2 or childClass0)
  CONTINUE;
else
  END;
```
⌒700

(b)

```
if (objY->class==superClass or childClass1 or childClass0)
  CONTINUE ;
else
  END ;
```
⌒702

OPTIMIZATION APPARATUS, OPTIMIZATION METHOD AND OPTIMIZATION PROGRAM

TECHNICAL FIELD

The present invention relates to a compiler optimization technique and, more particularly, to a compiler optimization technique for optimizing a virtual call guard in a recorded trace or a specialized linear execution path.

BACKGROUND ART

Trace-based compilers, which detect and compile a frequently executed linear instruction sequence on the basis of an execution profile, are known. Like optimization by guarded method inlining, a trace-based compiler inserts a guard called a virtual call guard used in runtime for checking whether a method recorded in a trace is the same as a method to be executed where a method to be invoked at the boundary between methods cannot uniquely be determined. A method that has this nature is known as a virtual method. A virtual method is a function for implementing "polymorphism", which is one of features of object-oriented languages.

There are two approaches to using a guard to perform the check described above. One, called class test, compares a class of a receiver object used for a virtual method call (an object used for determining a method to be actually invoked, hereinafter the same applies) at the recording time of the trace with an run-time class of the receiver object to determine whether the methods are the same (for example, see Patent Literatures 1 and 2). The other, called method test, checks whether the run-time class of a receiver object used in a virtual method call is a class that calls an inlined method.

For an optimization using guarded method inlining, there is a guard technique known as polymorphic inline cache (PIC). In the most classical virtual call guard optimization techniques, a call target is searched for every time a virtual method call is made. To avoid this, a technique called inline cache (IC) has been developed in which the most frequently appearing class at a call site is determined before a call, thereby avoiding searches in many situations. PIC is a technique that extends the IC to check multiple classes that frequently appear at a call site before a call (for example, see Non Patent Literature 1).

There is another technique that includes checking of the type of an object passed as a parameter, in addition to checking of the type of a receiver object of a virtual method that has an object reference as a parameter when the virtual method is inlined (for example see Patent Literature 3).

CITATION LIST

Patent Literature

[Patent Literature 1] US6175956
[Patent Literature 2] US6161217
[Patent Literature 3] US7716657

Non Patent Literature

[Non-patent Literature 1] Urs Holzle, Craig, Chambers, David Ungar, "Optimizing dynamically-typed object-oriented languages with polymorphic inline caches", ECOOP '91 proceedings, Springer Verlag Lecture Notes in Computer Science 512, Jul., 1991

SUMMARY OF INVENTION

The determination using the class test described above has the advantages that the overhead of checking for determination by comparison between pointers is low and that once determination has been made, checking of other virtual method calls that use the same receiver object can be omitted. However, the determination using the class test has the drawback that since determination as to whether methods are the same is based on whether or not their classes are the same, the determination fails when a different class calls the same method due to inheritance.

The determination using the method test, on the other hand, is capable of properly passing a guard when a different class calls the same method due to inheritance, because the method test determines whether a run-time class of a receiver object of a virtual method calls a recording-time method. However, the determination using the method test has the drawbacks that because a call's target needs to be resolved at execution and therefore the overhead of checking is high, the checking cannot be omitted unlike with the class test.

It is conceivable to set a plurality of classes that pass a guard in the class test as in PIC. However, since a class that frequently appears at a call site is not necessarily a class that calls a recording-time method, PIC cannot simply be used. The technique disclosed in Patent Literature 3 provides no solution to the problems described above because the technique addresses a situation where a plurality of objects is to be checked at one virtual method call.

The present invention has been made in order to solve the problems described above and an object of the present invention is to reduce overhead of a virtual call guard at the boundary between methods in a trace-based compiler or a method-based compiler in which path specialization is used, thereby improving system performance. Another object of the present invention is to provide a novel guard technique capable of overcoming the drawbacks of conventional class tests while retaining the advantages of the conventional class tests.

To solve the problems described above, one aspect of the present invention provides a first optimization method for optimizing a recorded trace or a specialized linear execution path (hereinafter collectively referred to as the "code sequence") by computer processing. The first optimization method includes the steps of (a) reading the code sequence from a storage device and inserting a method test for each of virtual methods included in the code sequence, (b) acquiring one or more profiled run-time classes of a receiver object used for calling each of the virtual methods at execution of the code sequence, (c) optimizing the code sequence by inserting, in place of the method test, a class test that sets a recording-time class of a receiver object corresponding to each of the virtual methods included in the code sequence and an run-time class as classes to be permitted if the run-time class of the corresponding receiver object has successfully called all virtual methods requesting the method test for the receiver object.

Preferably, if the number of classes to be permitted exceeds a predetermined threshold, step (c) adds only a class that has been profiled more times among the plurality of classes as a class to be permitted.

More preferably, step (c) inserts the class test only for a virtual method that is executed first in the code sequence among a plurality of virtual methods that use the same receiver object and omits inserting the class test for the other virtual methods.

More preferably, the run-time class of the receiver object used for calling each of the virtual methods is profiled if the run-time class has succeeded in all of the method tests inserted in the code sequence.

Another aspect of the present invention provides a second optimization method for optimizing the code sequence. The second optimization method includes (a) reading the code sequence from a storage device and, for each of virtual methods included in the code sequence, inserting a class test that sets a recording-time class of a receiver object used for calling the virtual method as a class to be permitted and a method test which is executed on condition that the class test has failed, (b) acquiring one or more profiled run-time classes of a receiver object used for calling each of the virtual methods at execution of the code sequence after the insertion step, and (c) optimizing the code sequence by adding an run-time class to a class permitted by the corresponding class test if the run-time class of a receiver object corresponding to each of the virtual methods included in the code sequence has successfully called all virtual methods requesting the method test for the receiver object.

Preferably, steps (b) and (c) are repeated for execution of the optimized code sequence.

More preferably, step (b) also acquires a profiled test result of the method test inserted for each virtual method and step (c) adds a run-time class of a receiver object used by a virtual method that has failed the method test to a corresponding class test as a class to be rejected.

More preferably, if the number of classes to be added as classes to be permitted or as classes to be rejected exceeds a predetermined threshold in the class test, step (c) adds only a class that has been profiled more times among the plurality of classes exceeding the predetermined threshold as a class to be permitted or a class to be rejected.

While the present invention has been described as an optimization method, the present invention can also be viewed as an optimization program for causing a computer to execute the steps of the optimization method described above and an optimization apparatus implemented by installing the optimization program on one or more computers.

According to the present invention, a class to be permitted to pass a virtual call guard is determined on the basis of the result of profiling during execution before or after compiling a code sequence using a method test as the virtual call guard and a plurality of classes that are permitted in subsequent class tests as virtual call guards can be set. Accordingly, the overhead of the virtual call guard at the boundary between methods can be reduced from conventional techniques and system performance can be improved. Other advantageous effects of the present invention will be understood from the description of embodiments.

BRIEF DESCRIPTION OF DRAWINGS

FIG. 3 is a diagram illustrating exemplary method definitions for individual classes;

FIG. 5 is a diagram illustrating an optimization process for the execution results illustrated in FIGS. 4(b), 4(c) and 4(d) in a first embodiment;

FIGS. 7(a) and 7(b) are diagrams illustrating an optimization process for the execution results illustrated in FIGS. 6(b), 6(c) and 6(d) in the first embodiment;

DETAILED DESCRIPTION OF PREFERRED EMBODIMENTS

Embodiments of the present invention will be described below in detail with reference to drawings. However, the embodiments described below are not intended to limit the present invention which is defined in the claims and not all combinations of features described in the embodiments are essential to the inventive solution.

Figure 1:
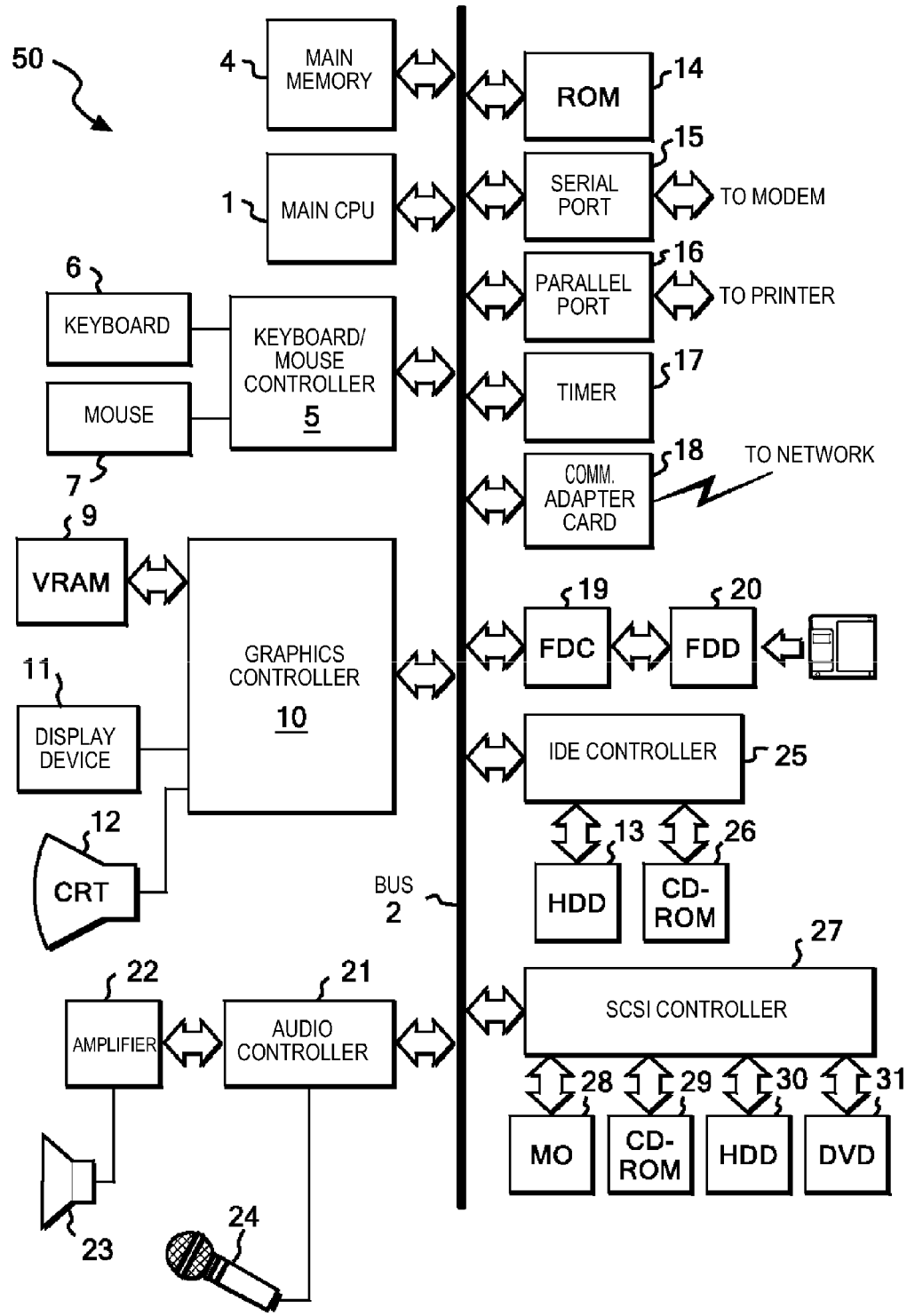
FIG. 1 is a configuration diagram illustrating a functional configuration of a computer system 50 to which an optimization method according to the present invention can be applied.

FIG. 1 illustrates a configuration of a computer system 50 to which the present invention can be applied. The computer 50 includes a main CPU (central processing unit) 1 and a main memory 4, which are connected to a bus 2. The CPU 1 is preferably based on a 32-bit or 64-bit architecture and may be a Core i™ series processor, a Core 2™ series processor, an Atom™ series processor, a Xeon™ series processor, a Pentium® series processor, or a Celeron® series processor from Intel® Corporation, or a Phenom™ series processor, an Athlon™ series processor, a Turion™ series processor, or a Sempron™ series processor from Advanced Micro Devices®, Inc. The main memory 4 may be a memory that has preferably a capacity of 1 GB or more, more preferably a capacity of 2 GB or more.

Hard disk devices 13, 30 and removable storages (external storage systems with exchangeable storage media) such as CD-ROM devices 26, 29, a flexible disk device 20, an MO device 28, and a DVD device 31 are also connected to the bus 2 through a flexible disk controller 19, an IDE controller 25, or a SCSI controller 27. Storage media such as a flexible disk, MO, CD-ROM, and DCD-ROM are loaded in the removable storages.

An operating system and programs that provide a processing environment such as J2EE, applications, a virtual machine (VM), a just-in-time (JIT) compiler, and other programs and data may be stored on these storage media, hard disk devices 13, 30, and a ROM 14 in such a manner that they can be loaded into the main memory 4. The operating system may be any operating system compatible with the CPU 1, such as Linux™, or Windows™ 7, Windows XP™, or Windows™ 2003 server from Microsoft Corporation®, or Mac OS™ from Apple® Computer Incorporated. In addition, a computer program for providing instruction to the CPU 1 in cooperation with the operation system to implement the present invention can be recorded on the storage media and hard disk devices 13, 30 and ROM 14 given above. That is, an optimization program which is installed on the computer system 50 and causes the computer system 50 to function as an optimization apparatus according to an embodiment of the present invention and various kinds of data can be recorded on the various storage devices given above.

The optimization program includes an insertion module, an acquisition module and an optimization module. The program and modules direct the CPU 1 to cause the computer system 50 to function as an insertion unit 212, an acquisition unit 214, and optimization unit 218, which will be described later. These functions may be implemented as part of the functions of a trace-based JIT compiler or a method-based JIT compiler to which Path specialization is applied. The computer program can be compressed or split into a plurality of parts and recorded on a plurality of media.

The computer system 50 receives inputs from input devices such as a keyboard 6 and a mouse 7 through a keyboard/mouse controller 5. The computer system 50 receives inputs from a microphone 24 through an audio controller 21 and outputs sound through a speaker 23. The computer system 50 is connected to a display device 11 for presenting visual data to a user through a graphic controller 10. The computer system 50 can be connected to a network through a network adapter 18 (Ethernet® card or a token ring card) to communicate with other computers and devices.

It will be readily apparent from the foregoing that the computer system 50 is implemented by an information processing apparatus such as a conventional personal computer, workstation, or mainframe computer, or a combination of these. The components described above are illustrative only and not all the components are essential to the present invention.

Figure 2:
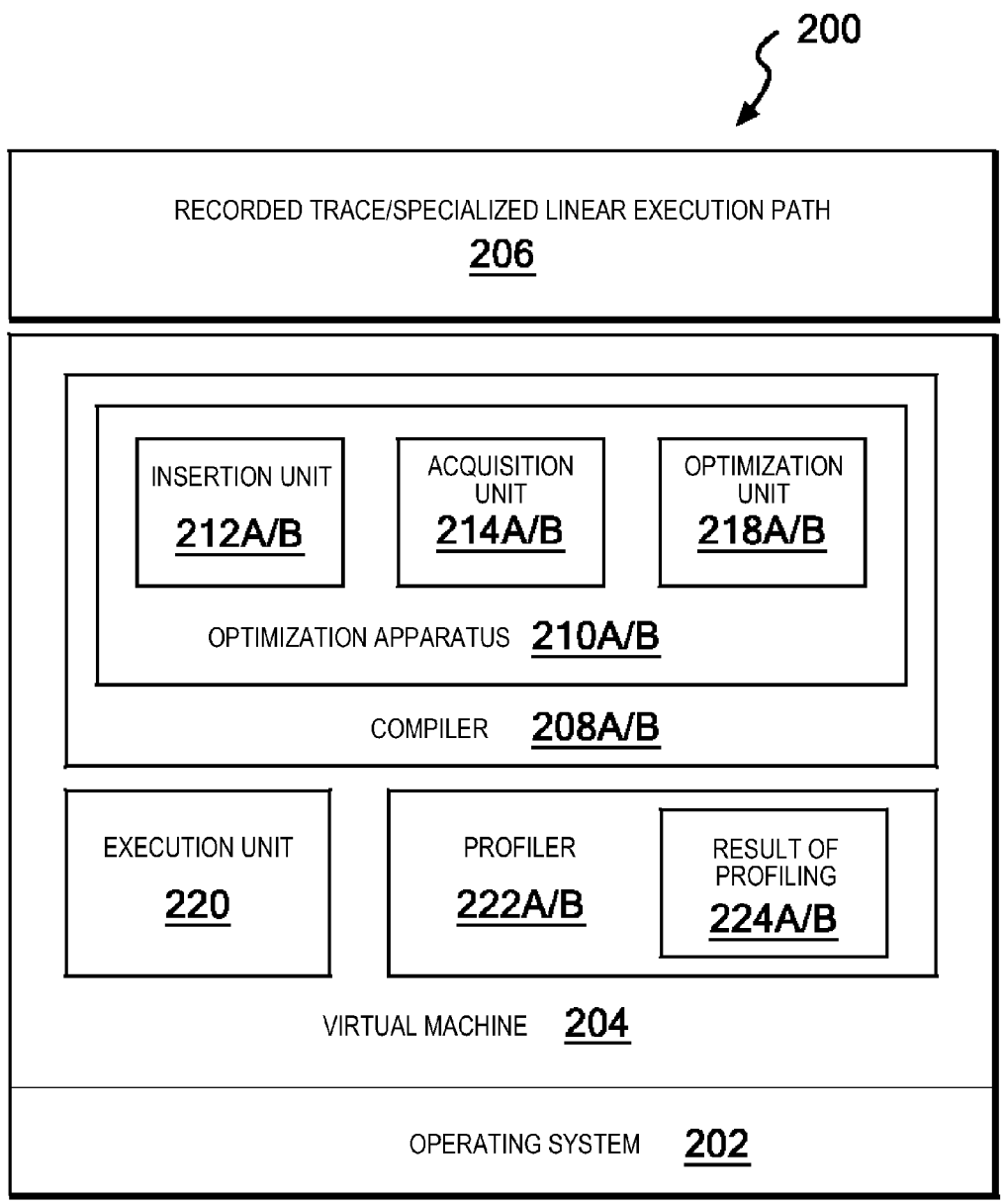
FIG. 2 is a block diagram illustrating a configuration of software that implements the present invention.

FIG. 2 is a block diagram illustrating a configuration of software that implements the present invention. An operating system 202 in FIG. 2 manages a CPU and memory as resources and implements time-division multithreading. A virtual machine 204 is software for interfacing between a recorded trace or a specialized linear execution path (hereinafter collectively referred to as a "code sequence") 206 which are part of a program to be executed and the operating system 202 and causes the virtual machine 204 and the entire hierarchy below the virtual machine 204 viewed from the code sequences 206 to operate as a Java® virtual machine. It is assumed in the following description that the virtual machine 204 is a Java® virtual machine.

The virtual machine 204 includes a compiler 208A/B which dynamically compiles a byte code into a machine language to generate a native code, thereby speeding up execution of the program, an execution unit (interpreter) 220 interpreting a program provided as an intermediate code such as a byte code, and a profiler 222A/B invoked according to the interpretation. Sign A of signs A/B assigned to the compiler 208 and the profiler 222 indicates that the compiler 208 and the profiler 222 are those according to a first embodiment of the present invention, which will be described later, and sign B indicates that the compiler 208 and the profiler 222 are those according to a second embodiment of the present invention, which will be described later. Signs A and B used hereinafter have the same meanings as above. The compiler 208A/B is a trace-based JIT compiler which compiles a trace as a unit or a method-based compiler which compiles a method as a unit. It is assumed here that in the latter case the method-based compiler uses path specialization. The compiler 208A according to the first embodiment of the present invention may be a compiler that performs static compilation, such as a C++ compiler. While it is assumed in the following description that a code for profiling is inserted by the compiler 208A/B, the present invention is not limited to this; the function of the profiler 222A/B may be implemented in the execution unit 220.

The compiler 208A/B includes an optimization apparatus 210A/B which optimizes a virtual call guard for calling a virtual method contained in a code sequence 206. The optimization apparatus 210A/B uses the result of checking by a method test, which is a virtual call guard, to set a plurality of classes as classes to be permitted in a class test, which is a virtual call guard.

The method test herein is a way to check whether a run-time class of a receiver object used in a virtual method call invokes a method inlined at the recording time, as described in the Background Art section. More specifically, the method test scans a method table for a run-time class of a receiver object, starting from the class, acquires the address of a method to be called from the method table, and determines whether the acquired address is the same as the address of an inlined method.

The class test compares a class of a receiver object at trace recording time used in a virtual method call with a run-time class to determine whether the methods are the same, as described in the Background Art section. Specifically, the test compares a pointer to a run-time class of a receiver object with a pointer to a class at the time of recording of the trace to determine whether both of them are the same. Both of the method test and class test themselves are existing techniques and therefore further description of the tests will be omitted.

Determination of classes to be permitted to pass a virtual call guard using the method test may be made on the basis of the result of profiling during execution before compilation or repeatedly made on the basis of the result of profiling during execution after compilation and a class to be permitted may be added at every time determination is made. In the following, the former will be described as a first embodiment and the latter will be described as a second embodiment.

(First Embodiment)

This section describes an approach in which classes to be permitted to pass a virtual call guard are determined on the basis of the result of profiling during execution before compilation of a code sequence 206 in which a method test has been inserted as a virtual call guard, and the inserted method test is replaced with a class method that permits a plurality of classes to optimize the virtual call guard. It should be noted that the compiler 208A compiles the code sequence 206 after the virtual call guard is optimized. As illustrated in FIG. 2, the optimization apparatus 210A according to the first embodiment includes an insertion unit 212A, an acquisition unit 214A and an optimization unit 218A.

The insertion unit 212A reads and then scans a code sequence 206 to be complied next and inserts a method test for each virtual method contained in the code sequence 206 as a virtual call guard. The method test is inserted at the boundary between methods. However, if it can be ascertained that the class of the receiver object is fixed at the beginning of the code sequence 206, the method test may be inserted at the beginning of the code sequence 206. For a plurality of virtual methods that use the same receiver object for calling the virtual methods, a single method test may be inserted. In that case, the method test to be inserted needs to ascertain that the run-time class of the receiver object used is a class that calls all of the plurality of virtual methods. The method test is inserted immediately before the first virtual method to be executed in the code sequence 206 among the plurality of virtual methods.

The insertion unit 212A also inserts a code that records the run-time class of a receiver object used for calling each virtual method if all method tests inserted succeed. For example, the insertion unit 212A inserts a code that profiles the run-time class of each receiver object (hereinafter referred to as "profiler A") at the end of the code sequence 206. If the code of profiler A is very long, preferably a code that invokes profiler A is inserted at the end of the code sequence 206. Execution of the code sequence 206 ends when a method test fails. Alternatively, the insertion unit 212A may insert a single method test for a plurality of virtual methods that use the same receiver object as described above, and may insert a code that profiles the run-time class of the receiver object used for calling the virtual methods and the result (success or failure) of the method test for each method test. In the former case, classes to be permitted to pass a virtual call guard can be determined on the basis of the result of profiling. In the latter case, on the other hand, classes to be permitted to pass a virtual call guard and classes to be rejected can be determined on the basis of the result of profiling. It is assumed that the former configuration is used in this embodiment. Details of the latter configuration will be described later with respect to the second embodiment. The insertion unit 212A generates a profile table for storing the results of profiling. Details of the profile table will be described later with reference to FIG. 8. The code sequence 206 in which method tests have been inserted is then repeatedly executed by the execution unit 220 in order to acquire a result of profiling.

The acquisition unit 214A reads profiling results 224A recorded by profiler A to acquire the run-time classes of receiver objects used for calling virtual methods contained in the code sequence 206. The acquisition unit 214A provides the acquired run-time classes of the receiver objects to the optimization unit 218A.

The optimization unit 218A replaces a method test inserted in the code sequence 206 with a class test if the run-time class of each receiver object received from the acquisition unit 214A has successfully called all of the virtual methods requesting the method test for each receiver object. In doing so, the optimization unit 218A sets a run-time class profiled for each corresponding receiver object as a class to be permitted for each class test, in addition to the class of the receiver object at the time of recording the code sequence 206.

As has been described above, the run-time class of each receiver object is recorded and profiled only if all of the method tests inserted in the code sequence 206 succeed. Therefore, if the optimization unit 218A has received the run-time classes of each receiver object from the acquisition unit 214A, the optimization unit 218A may perform the replacement without ascertaining that the condition described above is met.

When the number of run-time classes profiled for one receiver object exceeds a predetermined threshold, the optimization unit 218A preferably sets only top m classes (m is an integer greater than or equal to 1) that were more frequently profiled among the plurality of profiled run-time classes as the classes to be permitted. For that purpose, profiler A records the number of profiling runs along with run-time class information of a receiver object. If the number of classes permitted in class tests is enormous, the cost of checking can be high. Using the configuration described above enables a performance improvement while avoiding increase in cost.

Also preferably, the optimization unit 218A inserts a class test only for a virtual method call that is executed first among a plurality of virtual method calls that use the same receiver object and removes method tests already inserted for the remaining virtual method calls without inserting class tests. This can reduce the size of the code. The code sequence 206 that has undergone the processing by the optimization unit 218A is then complied into a machine language by the compiler 208A.

Figure 4:
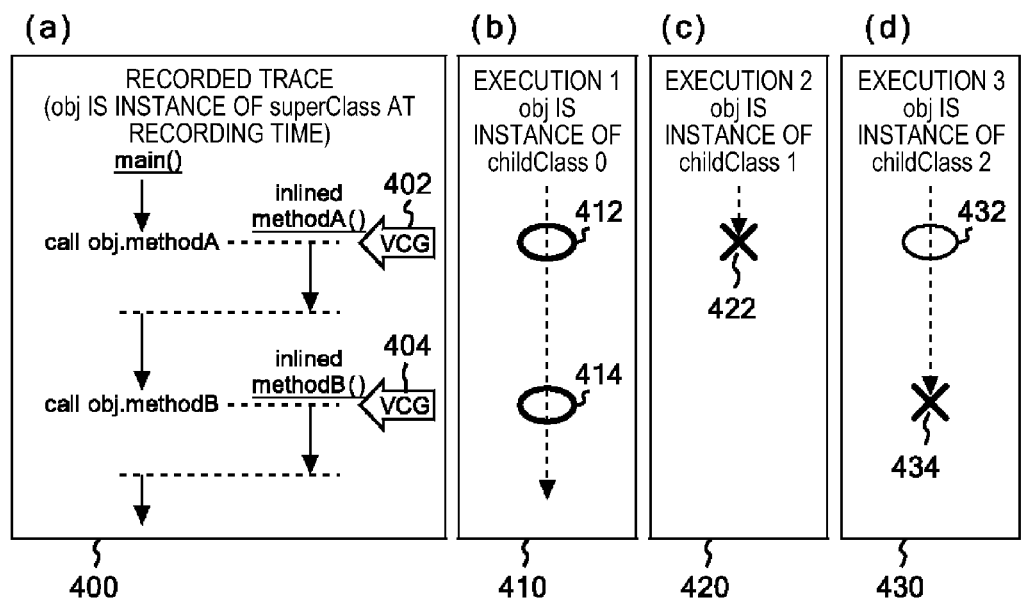
FIG. 4(a) is a diagram illustrating an example of a recorded trace.
FIGS. 4(b), 4(c) and 4(d) are diagrams illustrating exemplary execution results of the trace illustrated in FIG. 4(a) in a first embodiment.

A method for optimizing a virtual method guard on the basis of the result of profiling according to the first embodiment will be described below with reference to FIGS. 3 to 5. FIG. 3 is a diagram illustrating exemplary method definitions for individual classes. FIG. 4(a) illustrates an example of a recorded trace. FIGS. 4(b), 4(c) and 4(d) are diagrams illustrating exemplary results of execution of the trace illustrated in FIG. 4(a). FIG. 5 is a diagram illustrating an optimization process for the execution results illustrated in FIGS. 4(a), 4(b) and 4(c).

It is assumed in this example that a superClass having members, methodA and method, is extended to generate childClasses 0, 1 and 2 as illustrated in FIG. 3. Here, childClass0 directly inherits both of methodA and methodB, childClass1 has members methodA', which override methodA, and methodB, and childClass2 has members methodA and methodB', which override methodB.

The trace 400 contains two virtual method calls, callobj.methodA and callobj.methodB, as illustrated in FIG. 4(a). Since the receiver object obj used for the virtual method calls was an instance of superClass when the trace 400 was recorded, the members, methodA( ) and methodB( ) of superClass are inlined for the two virtual method calls in the recorded trace 400. The insertion unit 212A reads the trace 400 to be compiled and inserts method tests as virtual call guards 402 and 404, for the two virtual methods. The method tests inserted are tests that allow the execution to continue if the tests succeed and discontinue the execution if the tests fail. The insertion unit 212A also inserts profiler A directly or a code that calls profiler A at the end of the trace 400.

FIGS. 4(b), 4(c) and 4(d) illustrate the results of execution of the trace 400 by the execution unit 220 in order to acquire profiling results in the situation described above. In the execution result 410 illustrated in FIG. 4(b), the run-time class of the receiver object obj is childClass0. Since childClass0 directly inherited both methodA and methodB as has been described above, the method tests succeeded at both of a point 412 corresponding to the virtual call guard 402 and a point 414 corresponding to the virtual call guard 404 illustrated in FIG. 4(a). Consequently, profiler A records childClass0 as the run-time class of the receiver object obj.

In the execution result 420 illustrated in FIG. 4(c), the run-time class of the receiver object obj is childClass1. As has been described, childClass1 overrode methodA. Accordingly, the method test failed at a point 422 corresponding to the virtual call guard 402 illustrated in FIG. 4(a). Consequently, execution of the trace 400 is aborted and profiler A is not executed. Therefore, the run-time class, childClass1, of the receiver object obj is not recorded.

In the execution result 430 illustrated in FIG. 4(d), the run-time class of the receiver object obj is childClass2. As has been described above, childClass2 directly inherited methodA but overrode methodB. Therefore, the method test succeeded at a point 432 corresponding to the virtual call guard 402 illustrated in FIG. 4(a) but failed at a point 434 corresponding to the virtual call guard 404. Consequently, execution of the trace 400 is aborted and profiler A is not executed. Accordingly, the run-time class childClass2 of the receiver object obj is not recorded.

For the execution results illustrated in FIGS. 4(*b*), 4(*c*) and 4(*d*), the acquisition unit 214A acquires childClass0 as the result of profiling. The optimization unit 218A receives childClass0 from the acquisition unit 214A and uses childClass0 to optimize the virtual call guards 402 and 404 contained in the trace 400. FIG. 5 illustrates the optimized virtual call guards 402, 404. As illustrated in FIG. 5, the class test that replaced the method test sets superClass, which was the class of the receiver object at the time of recording of the trace 400, and childClass0, which is the profiled run-time class, as permitted classes. Since both of the virtual call guards 402 and 404 are virtual call guards for calling virtual methods that use the same receiver object obj, the class test as the virtual call guard 404, which would be executed after the virtual call guard 402, may be omitted.

Figure 6:
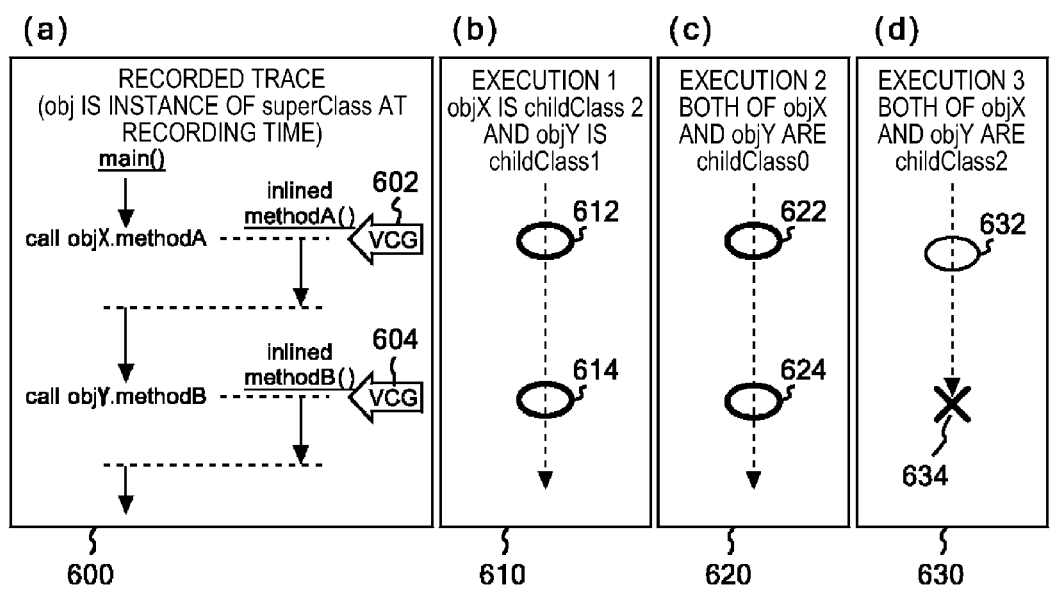
FIG. 6(a) is a diagram illustrating another example of a recorded trace.
FIGS. 6(b), 6(c) and 6(d) are diagrams illustrating exemplary execution results of the trace illustrated in FIG. 6(a)

Only one receiver object is used in the trace 400 in the example described with reference to FIGS. 4 and 5. A situation where two receiver objects are used in a trace will be described next with reference to FIGS. 6 and 7. FIG. 6(*a*) illustrates another example of a recorded trace. FIGS. 6(*b*), 6(*c*) and 6(*d*) are examples of results of execution of the trace illustrated in FIG. 6(*a*). FIG. 7 is a diagram illustrating an optimization process for the execution results illustrated in FIGS. 6(*b*), 6(*c*) and 6(*d*). The definitions of methods for individual classes are as described with reference to FIG. 3.

The trace 600 illustrated in FIG. 6(*a*) contains two virtual method calls, callobjX.methodA and callobjY.methodB. Since both of the receiver objects objX and objY used for calling virtual methods were instances of superClass at the time of recording the trace 600, the members, methodA( ) and methodB( ) of superClass were inlined for the two virtual method calls. The insertion unit 212A reads the trace 600 to be compiled and inserts method tests, virtual call guards 602 and 604, for the two virtual methods calls. The method tests inserted are tests that allow the execution to continue if the tests succeed and abort the execution if the tests fail. The insertion unit 212A also inserts profiler A directly or a code that calls profiler A at the end of the trace 600.

FIGS. 6(*b*), 6(*c*) and 6(*d*) illustrate the results of execution of the trace 600 by the execution unit 220 in order to acquire a result of profiling in the situation described above. In the execution result 610 illustrated in FIG. 6(*b*), the run-time class of the receiver object objX is childClass2 and the run-time class of receiver object objY is childClass1. Since the class childClass2 directly inherited methodA as illustrated in FIG. 3, the method test at a point 612 corresponding to the virtual call guard 602 illustrated in FIG. 6(*a*) succeeded. Similarly, since class childClass1 directly inherited methodB, the method test at a point 614 corresponding to the virtual call guard 604 succeeded. Consequently, profiler A records childClass2 and childClass1 as the run-time classes of the receiver objects objX and objY, respectively.

In the execution result 620 illustrated in FIG. 6(*c*), run-time classes of both of the receiver objects objX and objY are childClass0. Since childClass0 directly inherited methodA and methodB as has been described above, the method test succeeded at a point 622 corresponding to the virtual call guard 602 illustrated in FIG. 6(*a*) and a point 624 corresponding to the virtual call guard 604. Consequently, profiler A records childClass0 as the run-time classes of the receiver objects objX and objY.

In the execution result 630 illustrated in FIG. 6(*d*), the run-time classes of both of the receiver objects objX and objY are childClass2. As has been described above, childClass2 directly inherited methodA but overrode methodB. Therefore, the method test succeeded at a point 632 corresponding to the virtual call guard 602 illustrated in FIG. 6(*a*) but failed at a point 634 corresponding to the virtual call guard 604. Consequently, execution of the trace 600 is aborted and profiler A is not executed. Accordingly, the run-time class childClass2 of the receiver objects objX and objY is not recorded.

For the execution results illustrated in FIGS. 6(*b*), 6(*c*) and 6(*d*), the acquisition unit 214A acquires two classes, childClass2 and childClass0, for the receiver object objX and two classes, childClass1 and childClass0, for the receiver object objY as the results of profiling. The optimization unit 218A receives the profiling results from the acquisition unit 214A and uses the results to optimize the virtual call guards 602 and 604 contained in the trace 600. FIG. 7(*a*) illustrates the optimized virtual call guard 602 and FIG. 7(*b*) illustrates the optimized virtual call guard 604. As illustrated in FIG. 7(*a*), the class test that replaced the method test as the virtual call guard 602 sets childClass2 and childClass0, which are profiled run-time classes, as permitted classes in addition to superClass which was the class of the receiver object objX at the time of recording of the trace 600. Furthermore, as illustrated in FIG. 7(*b*), the class test that replaced the method test as the virtual call guard 604 sets childClass1 and childClass0, which are the profiled run-time classes, as permitted classes in addition to superClass which was the class of the receiver object objY at the time of recording of the trace 600. Since the virtual call guards 602 and 604 are virtual call guards for calling virtual methods that use different receiver objects, objX and objY, the method test as the virtual call guard 604, which is to be executed after the virtual call guard 602, cannot be omitted.

Figure 8:
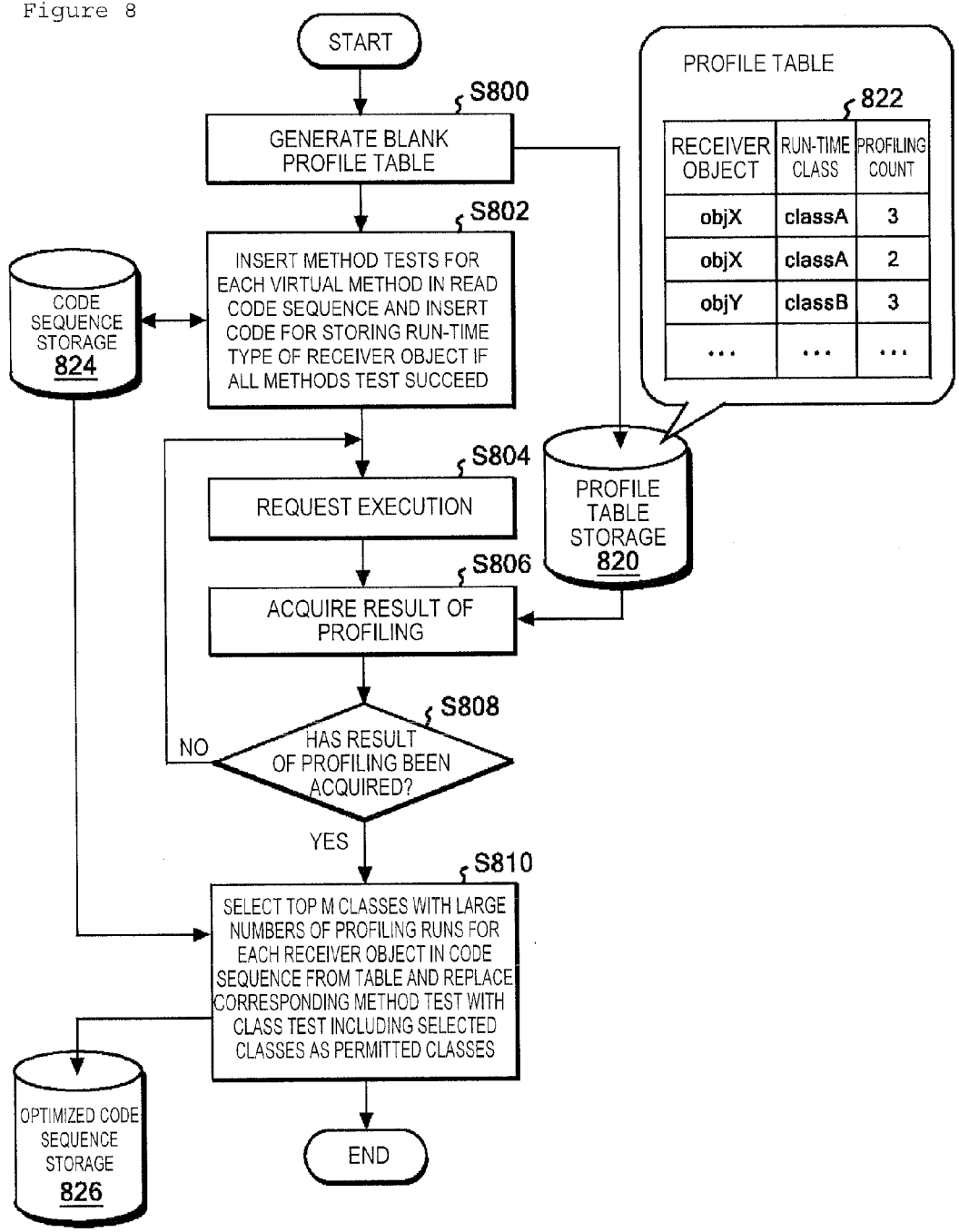
FIG. 8 is a flowchart of a whole optimization process according to the first embodiment of the present invention.

A flow of process performed by the optimization apparatus 210A according to the first embodiment of the present invention will be described below with reference to FIG. 8. The process illustrated in FIG. 8 starts at step 800 and the optimization apparatus 210A generates a blank profile table 822 for storing the results of profiling. The generated profile table 822 includes a receiver object field, a run-time class field and a profiling count field. An entry of the receiver object field contains the name of a receiver object to be profiled. An entry of the run-time class field contains the run-time class of a receiver object to be profiled. An entry of the profiling count field contains the number of profiling runs in which the same result in the entry was obtained as a result of profiling.

The optimization apparatus 210A then reads the next code sequence 206 to be compiled from a code sequence storage 824 and inserts method tests for virtual methods contained in the read code sequence 206 (step 802). The optimization apparatus 210A also inserts a code that records the run-time class of the receiver object used for each virtual method call and the number of profiling runs if all of the method tests inserted succeed (step 802).

When executed, the code inserted will operate as follows. The code uses the name of each of the receiver objects included in the code sequence 206 and the current class of the receiver object as a key to search the profile table 822. If there is a matching entry, the code increments the value in the profiling count field of the entry by 1; if there is not a matching entry, the code adds a new entry having the name of the current receiver object in the receiver object field, the current class of the receiver object in the run-time class field, and a value of 1 in the profiling count field. The code sequence 206 which has undergone the insertion process is returned to the code sequence storage 824.

The optimization apparatus 210A then requests the execution unit 220 to execute the code sequence 206 which has undergone the insertion process (step 804) and attempts to acquire the result of profiling (step 806). Execution by the execution unit 220 is repeated a predetermined number of times. The optimization apparatus 210A determines whether or not a result of profiling has been acquired (step 808) and, if no profiling result has been acquired (NO at step 808), the optimization apparatus returns to step 804 and requests execution of the code sequence 206 again.

On the other hand, if results of profiling has been acquired (YES at step 808), the optimization apparatus 210A selects top m entries (m is an integer greater than or equal to 1) with larger profiling counts from the profile table for each receiver object contained in the code sequence 206, generates codes of class tests that set the run-time classes in the selected entries and the classes at the time of recording of the code sequence 206 as permitted classes, and replaces the corresponding method tests in the code sequence 206 with the class tests (step 810). If a plurality of method tests relating to the same receiver object is contained in the code sequence 206, the optimization apparatus 210A may replace only the first method test to be executed in the code sequence 206 with the generated class test and may remove the other method tests. The code sequence 206 in which the virtual call guards are optimized with the class tests that permit a plurality of classes to pass is stored in an optimized code sequence storage 826 for compilation by the compiler 208A. Then the process ends.

(Second Embodiment)

This section describes an approach in which classes to be permitted to pass a virtual call guard are determined on the basis of the result of profiling in execution of a code sequence 206 in which a class test and a method test which is executed if the class test fails are inserted as virtual call guards and, each time a new class to be permitted is found, the class is added as a permitted class for the class test, thereby optimizing the virtual call guard. The compiler 208B may or may not perform compilation each time a permitted class is added. As illustrated in FIG. 2, the optimization apparatus 210B according to the second embodiment includes an insertion unit 212B, an acquisition unit 214B and an optimization unit 218B.

The insertion unit 212B reads and then scans a code sequence 206 to be complied next and inserts a class test and a method test that will be executed if the class test fails (hereinafter both types of tests are collectively referred to as "type tests") as virtual call guards for each of the virtual methods contained in the code sequence 206. The classes to be permitted to pass the class tests inserted here are the classes of the corresponding receiver objects at the time of recording of the code sequence 206. Each of the type tests is inserted at the boundary between methods. However, if it can be ascertained that the class of the receiver object is fixed at the beginning of the code sequence 206, the method test may be inserted at the beginning of the code sequence 206. For a plurality of virtual methods that use the same receiver object for virtual method invocation, a single type test may be inserted. In that case, the method test in the type test to be inserted needs to ascertain that the run-time class of the receiver object used is a class that calls all of the plurality of virtual methods. The insertion unit 212B generates a list that lists a pair of virtual method and receiver object used for calling the virtual method for all of the virtual methods contained in the code sequence 206 for the purpose of the ascertainment. The type test is inserted in a position before the first virtual method to be executed among the plurality of virtual methods in the code sequence 206.

The insertion unit 212B also inserts a code that records the run-time class of a receiver object used for calling each virtual method if all type tests inserted are successful. For example, the insertion unit 212B inserts a code that profiles the run-time class of each receiver object at the end of the code sequence 206. Execution of the code sequence 206 ends when a method test fails. Alternatively, the insertion unit 212B may insert a single type test for a plurality of virtual methods that use the same receiver object as described above and, for each type test, may insert a code that profiles the run-time class of a receiver object used for calling the virtual methods and the result (success or failure) of the method test if the method test is executed (hereinafter the code is referred to as "profiler B"). If the code of profiler B is very long, preferably a code that invokes profiler B is inserted at the end of the code sequence 206. By profiling the results of method tests as well, both of classes to be permitted to pass the virtual call guard and classes to be rejected can be determined on the basis of the result of the profiling. This configuration will be described in this example. The insertion unit 212B generates a profile table for storing results of profiling. Details of the profile table will be described later with reference to FIG. 14. The code sequence 206 which has undergone the process by the insertion unit 212B is then executed by the execution unit 220 or, if the code sequence 206 has been complied by the compiler 208B, executed by the CPU 1.

The acquisition unit 214B reads profiling results 224B recorded by profiler B in execution of the code sequence 206 which has undergone the insertion process. If information about the receiver objects contained in the code sequence 206 is recorded, the acquisition unit 214B acquires run-time classes and results of method tests. The acquisition unit 214B provides the acquired run-time classes of the receiver objects and the corresponding test results to the optimization unit 218B.

For each run-time class of each of the receiver objects received from the acquisition unit 214B, if the run-time class succeeds in calling all virtual methods that request the method test of the receiver object, the optimization unit 218B adds the run-time class as a class to be permitted by the corresponding class test inserted in the code sequence 206, that is, the class test corresponding to each virtual method that uses the receiver object. As has been described, the method test inserted in this example determines whether the run-time class of a receiver object calls all virtual methods that use the receiver object. The optimization unit 218B therefore determines whether the condition described above is satisfied or not on the basis of the result of the corresponding test.

Furthermore, for each of the run-time class of each receiver object received from the acquisition unit 214B, if the run-time class fails to call any of the virtual methods that request a method test of the receiver object, the optimization unit 218B adds the run-time class as a class to be rejected by each corresponding class test inserted in the code sequence 206, that is, the class test of each of the virtual methods that use the receiver object. The optimization unit 218B determines whether the condition described above is satisfied or not on the basis of the result of the corresponding test for the same reason described with respect to addition of classes to be permitted.

If the number of classes to be permitted or rejected in any of the class tests exceeds a predetermined threshold, the optimization unit 218B may add only top m classes (m is an integer greater than or equal to 1) that have high profiling counts among those classes as classes to be permitted or rejected. In that case, the profiler 222B records the profiling counts along with the run-time class and the test result. As has been described earlier, if the number of classes permitted or rejected in class tests is enormous, the cost of checking can be high. Using the configuration described above enables a performance improvement while avoiding increase in cost.

The code sequence 206 which has undergone the process by the optimization unit 218B is then executed by the execution unit 220 or, if the code sequence 206 has been compiled by the compiler 208B, executed by the CPU 1. Based on the result of profiling obtained by the profiler 222B in the execution, the process by the acquisition unit 214B and the optimization unit 218B described above is repeated.

Figure 9:
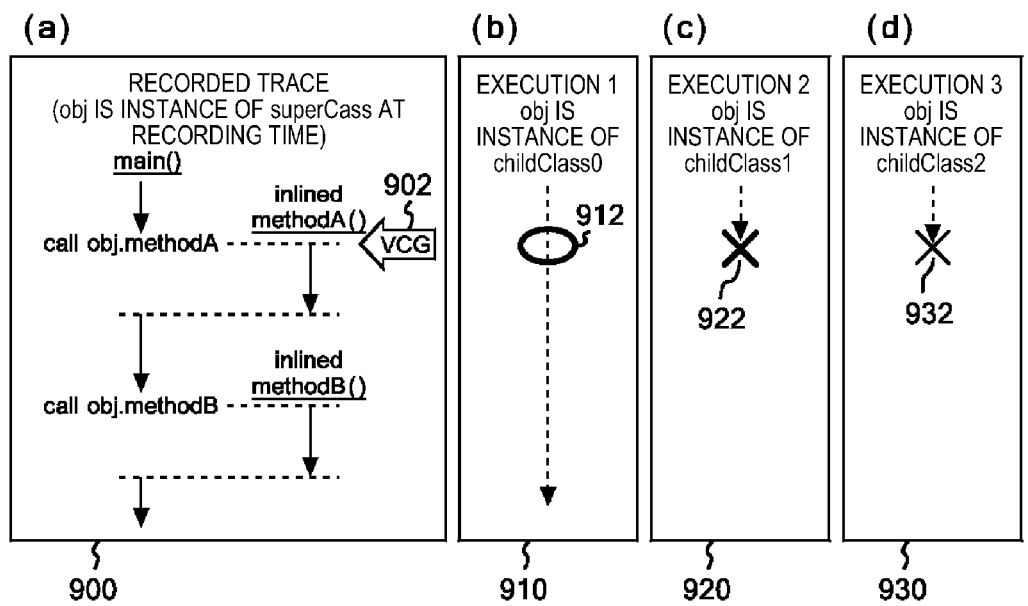
FIG. 9(a) is a diagram illustrating an example of a recorded trace.
FIGS. 9(b), 9(c) and 9(d) are diagrams illustrating exemplary execution results of the trace illustrated in FIG. 9(a)
Figure 10:
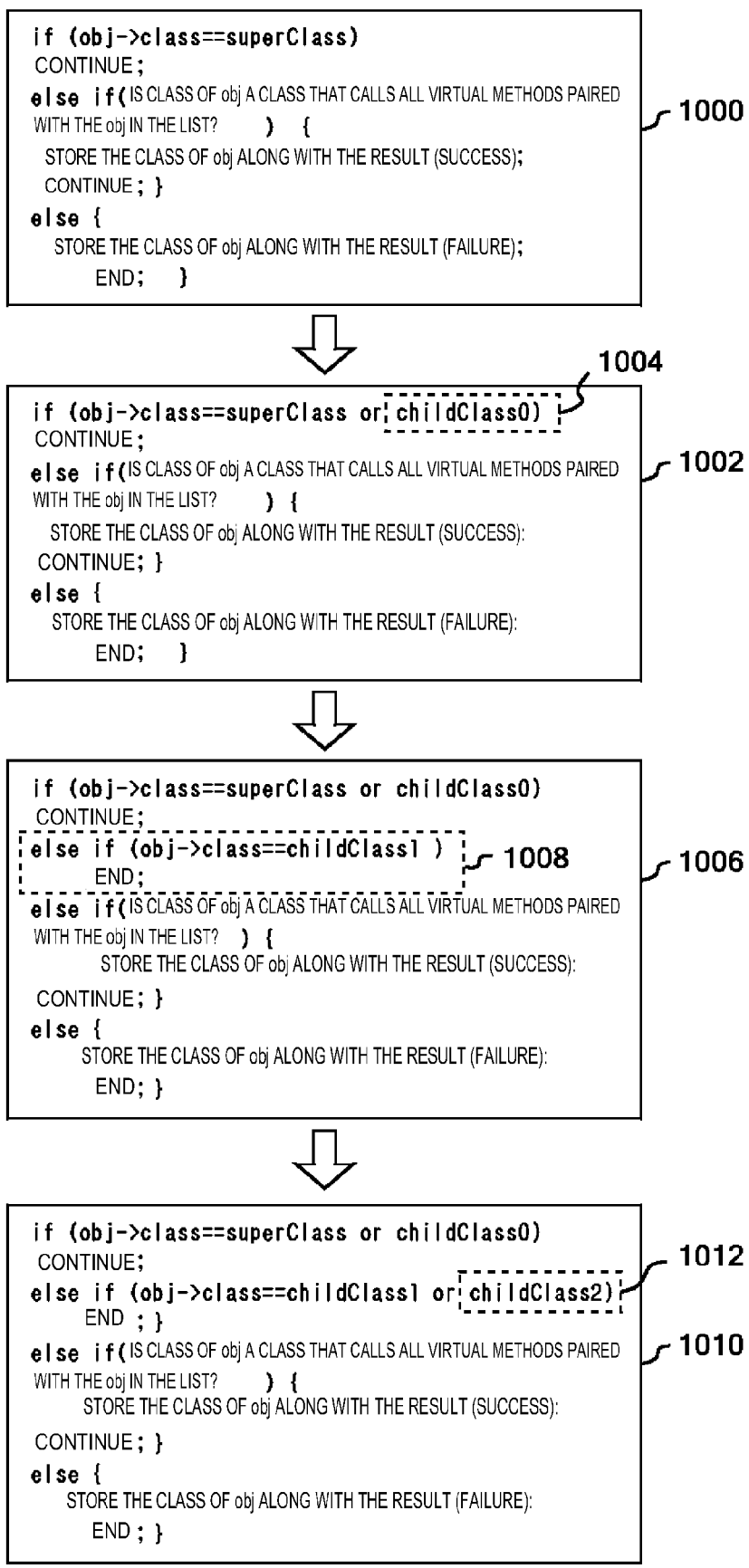
FIG. 10 is a diagram illustrating an optimization process for the execution results illustrated in FIGS. 9(a), 9(b) and 9(c) in a second embodiment.

The method for optimizing a virtual call guard on the basis of the result of profiling according to the second embodiment will be described in detail with reference to FIGS. 3, 9 and 10. FIG. 3 is a diagram illustrating exemplary method definitions for individual classes as stated earlier. FIG. 9(a) illustrates an example of a recorded trace. FIGS. 9(b), 9(c) and 9(d) are diagrams illustrating the results of execution of the trace illustrated in FIG. 9(a). FIG. 10 is a diagram illustrating an optimization process for the execution results illustrated in FIGS. 9(a), 9(b) and 9(c) in the second embodiment.

FIG. 3 has been described with respect to the optimization method according to the first embodiment. The trace 900 illustrated in FIG. 9(a) contains two virtual method calls, callobj.methodA and callobj.methodB. Since the receiver object obj used for the virtual method calls was an instance of superClass at the time of recording of the trace 900, the members, methodA( ) and methodB( ) of superClass were inlined for the two virtual method calls in the recorded trace 900. The insertion unit 212B reads the trace 900 and generates a list, {(obj, methodA), (obj, methodB)}, that lists a pair of virtual method and receiver object used for calling the virtual method for every virtual method contained in the trace 900. Since the same receiver object is used for calling the two virtual methods, the insertion unit 212B inserts one type test, a virtual call guard 902, for only the virtual method to be executed first. The virtual call guard 902 inserted includes a class test that sets superClass as a permitted class of the receiver object obj and a method test that is executed if the class test fails. Here, the method test is a test that refers to the list to test whether the current class of a receiver object obj is a class that calls all virtual methods paired with the receiver object obj on the list. If the test succeeds, the execution is continued; if the test fails, the execution is aborted. The insertion unit 212B inserts profiler B for the inserted method test. A code 1000 illustrated in FIG. 10 is an example of a code inserted by the insertion unit 212B.

FIGS. 9(b), 9(c) and 9(d) illustrate the results of execution of the trace 900 in a situation where the methods of classes are defined as illustrated in FIG. 3. In the execution result 910 illustrated in FIG. 9(b), the run-time class of the receiver object obj was childClass0, which was different from the class at the recording time of the trace 900. Accordingly, the method test inserted in the trace 900 as the virtual call guard 902 was executed. Since childClass0 directly inherited methodA and methodB, the method test succeeded. Since the method test is executed, profiler B is executed and chidClass0 as the run-time class of the receiver object obj and the result of the method test (success) are recorded.

For the execution result illustrated in FIG. 9(b), the acquisition unit 214B acquires the profiling result described above and provides the profiling result to the optimization unit 218B. Since the result of the method test for the run-time class, childClass0, of the receiver object obj is success, the optimization unit 218B adds the class childClass0 as a permitted class in the corresponding class test contained in the trace 900 which has undergone the insertion process described above. A code 1002 in FIG. 10 illustrates the virtual call guard 902 optimized by the addition of the profiled run-time class childClass0 (reference numeral 1004) as a permitted class for the class test.

In the execution result 920 illustrated in FIG. 9(c), the run-time class of the receiver object obj was childClass1, which was different from the class, superClass, at the time of recording of the trace. Accordingly, the method test inserted in the recorded trace 900 was executed. Since childClass1 overrode methodA, the method test failed. Since the method test was executed, profiler B is executed and the run-time class, childClass1, of the receiver object obj and the result (failure) of the method test are recorded. It should be noted that when the process by the profiler B ends because of the failure of the method test, the execution of the trace 900 ends.

For the execution result 920 illustrated in FIG. 9(c), the acquisition unit 214B acquires the result of the profiling described above and provides it to the optimization unit 218B. Since the result of the method test on the run-time class, childClass1, of the receiver object obj is failure, the optimization unit 218B adds a rejected class in which the class childClass1 is set to the corresponding class test contained in the trace 900 after the optimization process described above. A code 1006 in FIG. 10 illustrates the virtual call guard 902 optimized by the addition of the rejection class in which the profiled run-time class childClass1 is set to the class test (reference numeral 1008). In the execution result 930 illustrated in FIG. 9(d), the run-time class of the receiver object obj was childClass2, which was different from the class, superClass, at the recording time of the trace. Accordingly, a method test inserted in the recorded trace 900 was executed. Since childClass2 inherited methodA but overrode methodB, the method test failed. Since the method test is executed, profiler B is executed and the run-time class, childClass2, of the receiver object and the result (failure) of the method test are recorded.

For the execution result 930 illustrated in FIG. 9(d), the acquisition unit 214B acquires the result of the profiling described above and provides it to the optimization unit 218B. Since the result of the method test on the run-time class childClass2 of the receiver object obj is failure, the optimization unit 218B adds the class childClass2 as a rejected class to the corresponding class test contained in the trace 900 after the optimization process described above. A code 1010 in FIG. 10 illustrates the virtual call guard 902 optimized by the addition of the profiled run-time class childClass2 (reference numeral 1012) as a rejected class for the class test.

Figure 11:
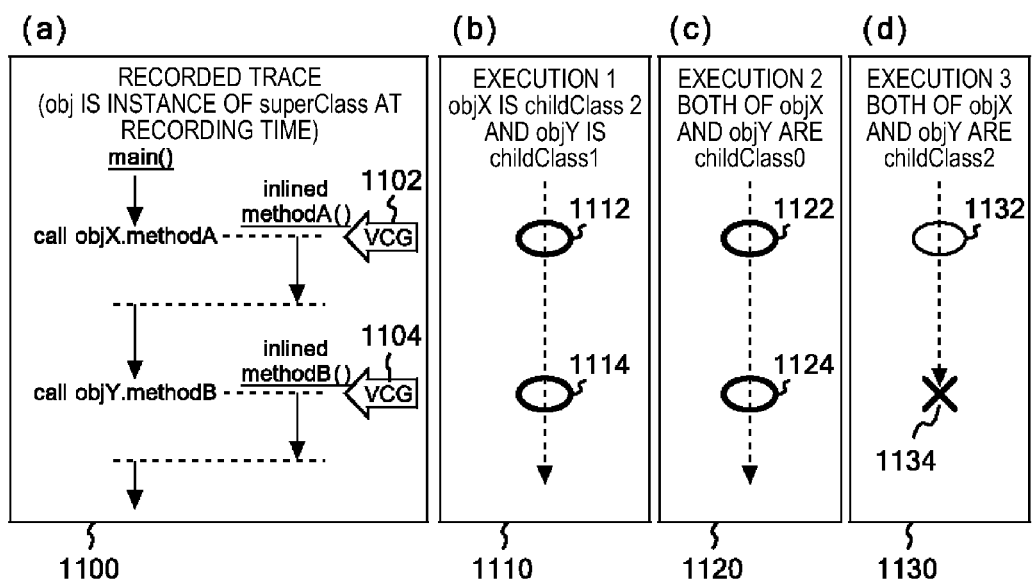
FIG. 11(a) is a diagram illustrating an example of a recorded trace.
FIGS. 11(b), 11(c) and 11(d) are diagrams illustrating exemplary execution results of the trace illustrated in FIG. 11(a)
Figure 12:
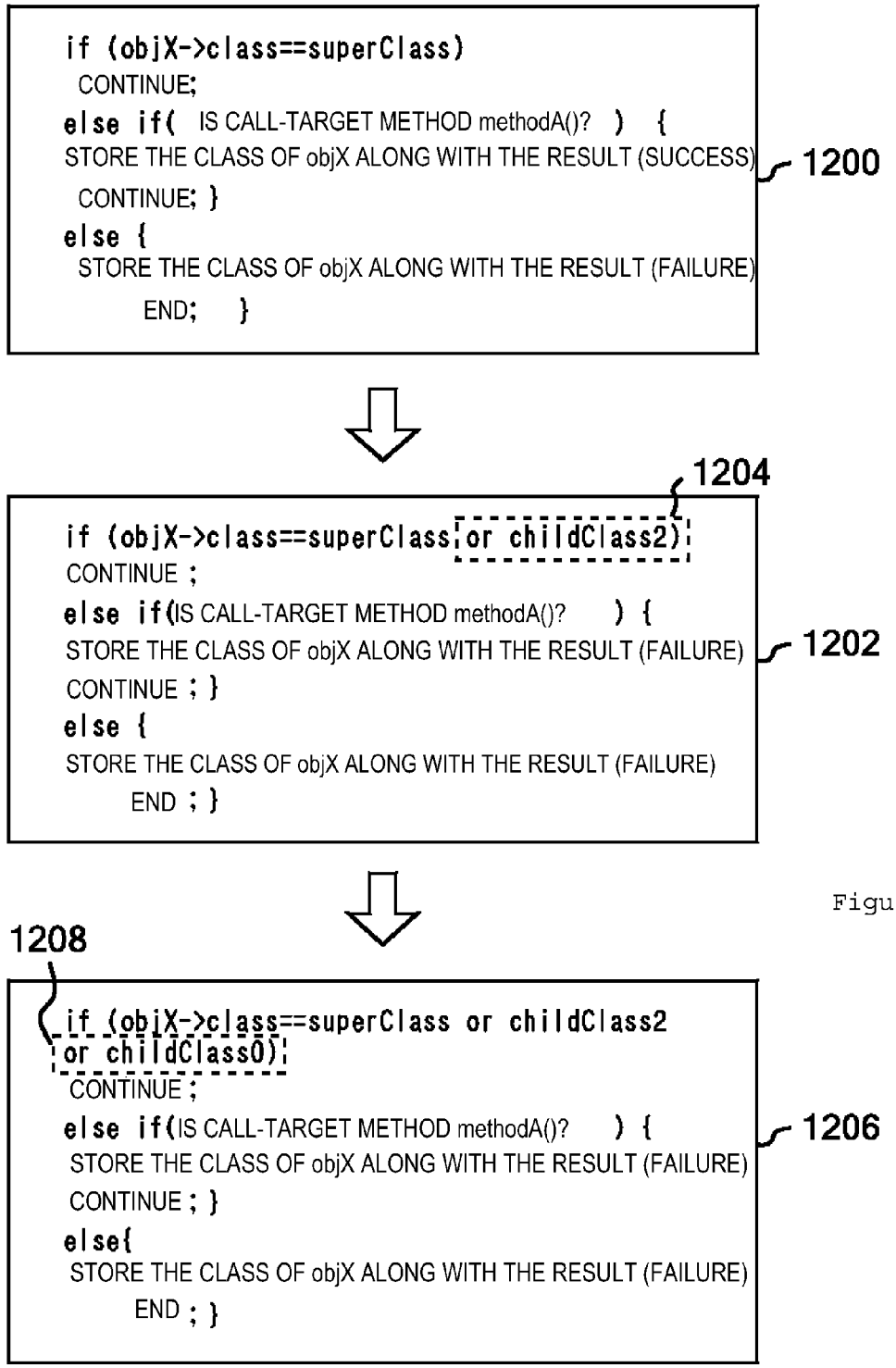
FIG. 12 is a diagram illustrating an optimization process for the execution results illustrated in FIGS. 11(b), 11(c) and 11(d) in the second embodiment.
Figure 13:
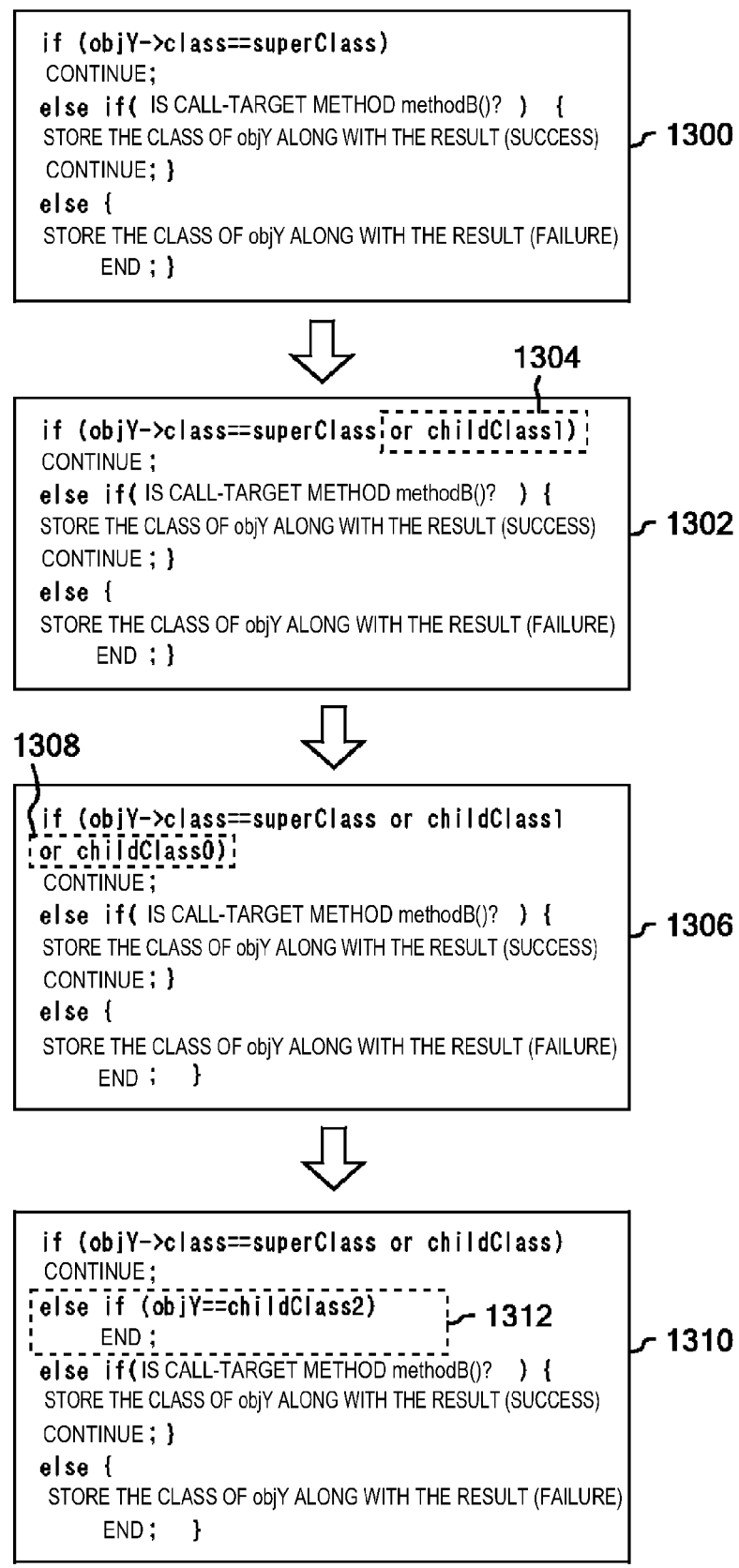
FIG. 13 is a diagram illustrating an optimization process for the execution results illustrated in FIGS. 11(b), 11(c) and 11(d) in the second embodiment.

In the example described with reference to FIGS. 3, 9 and 10, only one receiver object is used in the trace 900. An example in which two receiver objects are used in a trace will be described next with reference to FIGS. 11 to 13. FIG. 11(a) illustrates another example of recorded trace. FIGS. 11(b), 11(c) and 11(d) illustrate exemplary results of execution of the trace illustrated in FIG. 11(a). FIGS. 12 and 13 are diagrams illustrating an optimization process for the execution results illustrated in FIGS. 11(b), 11(c) and 11(d). Method definitions for individual classes are as described with reference to FIG. 3.

The trace 1100 illustrated in FIG. 11(a) contains two virtual method calls, callobjX.methodA and callobjY.methodB. Since both of the receiver objects objX and objY used for calling the virtual methods were instances of superClass at the time of recording the trace 1100, the members, methodA( ) and methodB( ), of superClass were inlined for the two virtual method calls in the recorded trace 1100. The insertion unit 212B reads the trace 1100 and inserts a class test that sets superClass as a permitted class of the receiver object obj and a method test that is executed if the class test fails as virtual call guards 1102 and 1104, respectively, for each of the two virtual method calls. The method test inserted is a test that allows execution to continue if the test succeeds and ends execution if the test fails. The insertion unit 212B also inserts profiler B for each of the inserted method tests. A code 1200 in FIG. 12 is an example of a code inserted as a virtual call guard 902 and profiler B. A code 1300 in FIG. 13 is an example of a code inserted as a virtual call guard 904 and profiler B.

FIGS. 11(*b*), 11(*c*) and 11(*d*) illustrate results of execution of the recorded trace 1100 illustrated in 11(*a*) in the situation described above. In the execution result illustrated in FIG. 11(*b*), the run-time class of the receiver object objX is childClass2 and the run-time class of the receiver object objY is childClass1. Since both classes were different from the class, superClass, at the recording time of the trace, both of the methods tests were executed. Since childClass2 directly inherited methodA as has been described above, the method test succeeded at a point 1112 corresponding to the virtual call guard 1102 is illustrated in FIG. 11(*a*). Similarly, since the class childClass1 directly inherited methodB, the method test succeeded at a point 1114 corresponding to the virtual call guard 1104 is illustrated in FIG. 11(*a*). Since the method tests are executed, profiler 222B is executed at each of points 1112 and 1114 and the run-time class, childClass2, of the receiver object objX and the run-time class, childClass1, of the receiver object objY are recorded along with the result (success).

For the execution results 1110 illustrated in FIG. 11(*b*), the acquisition unit 214B acquires the results of the profiling described above and provides them to the optimization unit 218B. Since the result of the method test on the run-time class childClass2 of the receiver object objX is success, the optimization unit 218B adds the class childClass2 as a class to be permitted for the corresponding class test contained in the trace 1100 which has undergone the insertion process described above. A code 1202 in FIG. 12 illustrates the virtual call guard 1102 optimized by the addition of the profiled run-time class, childClass2 (reference numeral 1204), as a class to be permitted for the class test. Similarly, since the result of the method test on the run-time class, childClass1, of the receiver object objY is success, the optimization unit 218B adds the class childClass1 as a class to be permitted for the corresponding class test contained in the trace 1100 which has underwent the insertion process described above. A code 1302 in FIG. 13 illustrates the virtual call guard 1104 optimized by the addition of the profiled run-time class childClass1 (reference numeral 1304) as a class to be permitted for the class test.

In the execution result 1120 illustrated in FIG. 11(*c*), the run-time classes of both of the receiver objects objX and objY were childClass0, which was different from the class, superClass, at the recording time of the trace. Accordingly, both of the method tests were executed. Since childClass0 directly inherited methodA and methodB as has been described above, the method tests succeeded at a point 1122 corresponding to the virtual call guard 1102 illustrated in FIG. 11(*a*) and a point 1124 corresponding to the virtual call guard 1104. Since the method tests are executed, profiler 222B is executed at both of the points 1122 and 1124 and the run-time class, childClass0, of the receiver objects objX and objY are recorded along with the result (success) of the tests.

For the execution result 1120 illustrated in FIG. 11(*c*), the acquisition unit 214B acquires the result of the profiling described above and provides it to the optimization unit 218B. Since the result of the method test on the run-time class, childClass0, of the receiver object objX is success, the optimization unit 218B adds the class childClass0 as a class to be permitted for the corresponding class test contained in the trace 1100 which has undergone the insertion process described above. A code 1206 in FIG. 12 illustrates the virtual call guard 1102 optimized by the addition of the profiled run-time class childClass0 (reference numeral 1208) as a class to be permitted for the class test. Similarly, since the result of the method test on the run-time class, childClass0, of the receiver object objY is success, the optimization unit 218B adds the class childClass0 as a class to be permitted for the corresponding class test contained in the trace 1100 which has undergone the insertion process described above. A code 1306 in FIG. 13 illustrates the virtual call guard 1104 optimized by the addition of the profiled run-time class childClass0 (reference numeral 1308) as a class to be permitted for the class test.

In the execution result illustrated in FIG. 11(*d*), since the run-time classes of both of the receive objects objX and objY were childClass2, which was different from the class, superClass, at the recording time of the trace, both of the method tests were executed. As has been described above, childClass2 directly inherited methodA but overrode methodB. Accordingly, the method test at a point 1132 corresponding to the virtual call guard 1102 illustrated in FIG. 11(*a*) succeeded but the method test at a point 1134 corresponding to the virtual call guard 1104 failed. Since the method tests are executed, profiler 222B is executed at each of points 1132 and 1134 and the run-time class, childClass2, of the receiver object objX is recorded along with the test result (success) and the run-time class, childClass2, of the receiver object objY is recorded along with the test result (failure).

For the execution result 1130 illustrated in FIG. 11(*d*), the acquisition unit 214B acquires the results of the profiling described above and provides them to the optimization unit 218B. Since the run-time class childClass2 of the receiver object objX was already added during the optimization process for the execution result in FIG. 11(*b*), the optimization unit 218B performs nothing for the object objX. On the other hand, the result of the method test on the run-time class childClass2 of the receiver object objY is failure. Accordingly, the optimization unit 218B adds a new rejected class in which the class childClass2 is set to the corresponding class test contained in the trace 1100 which has undergone the insertion process described above. A code 1310 in FIG. 13 illustrates the virtual call guard 1104 optimized by the addition of the profiled run-time class childClass2 as a rejected class (reference numeral 1312 in FIG. 13).

Figure 14:
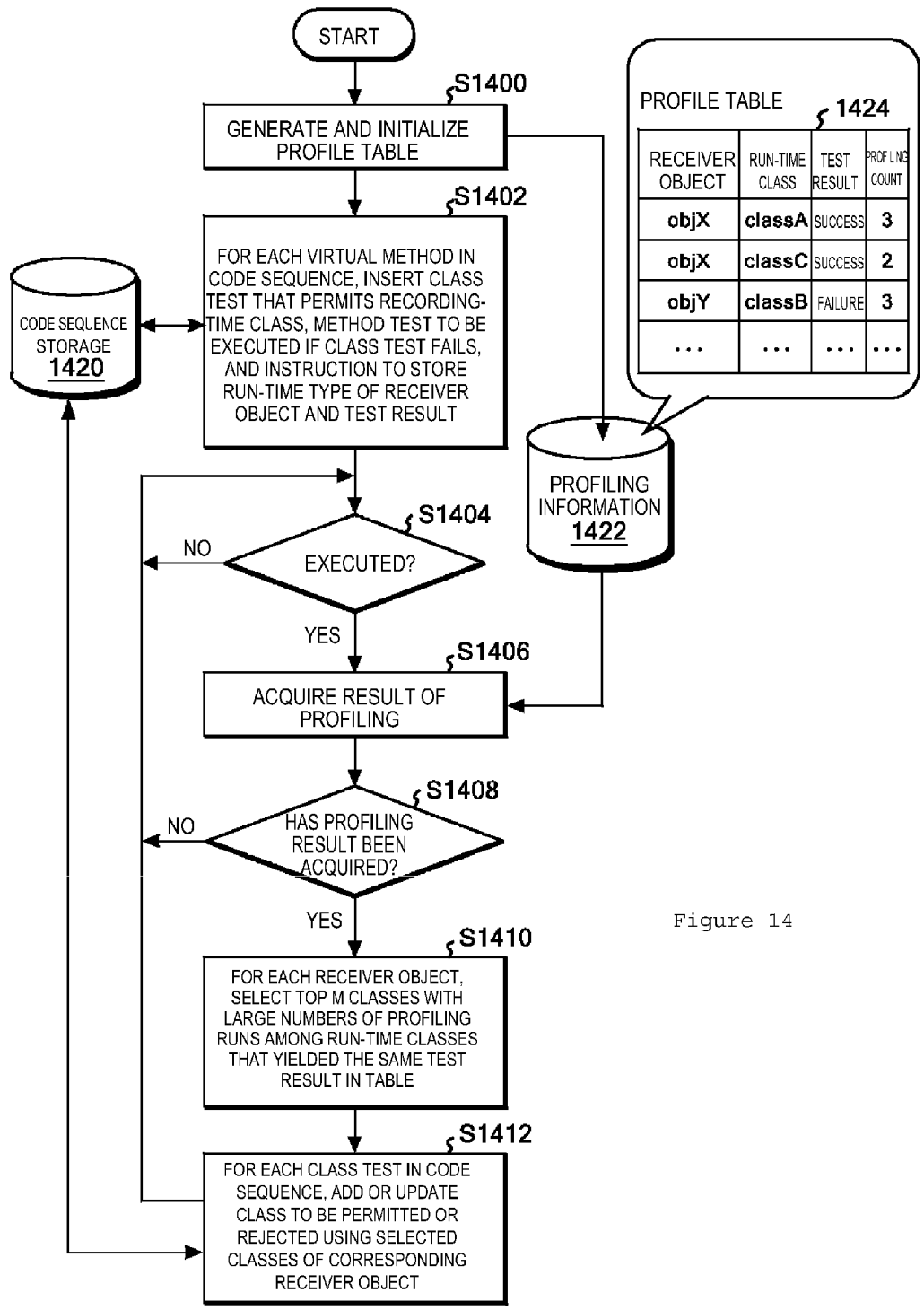
FIG. 14 is a flowchart of a whole optimization process according to the second embodiment of the present invention.

A flow of process performed by the optimization apparatus 210B according to the second embodiment of the present invention will be described below with reference to FIG. 14. The process illustrated in FIG. 14 starts at step 1400, where the optimization apparatus 210B generates a blank profile table 1424 for storing results of profiling. The generated profile table 1424 includes a receiver object field, a run-time class field, a test result field, and a profiling count field. An entry of the receiver object field contains the name of a receiver object to be profiled. An entry of the run-time class field contains the run-time class of the receiver object to be profiled. An entry of the test result field contains a result of the method test to be profiled. An entry of the profiling count field contains the number of profiling runs in which the same result in the entry was obtained as a result of profiling.

The optimization apparatus 210B then reads a code sequence 206 to be compiled next from code storage 1420 and inserts a class test and a method test that is executed if the class test fails, that is, a type test, for each of the virtual methods contained in the read code sequence 206 (step 1402). For virtual methods that use the same receiver object, the optimization apparatus 210B inserts one type test, as has been described above. The optimization apparatus 210A also inserts, for each of the type tests inserted, a code for recording the run-time class of the receiver object used for calling a virtual method, the result of the method test, and the profiling count if the method test is executed (step 1402).

When executed, the code inserted will operate as follows. The code acquires the name of the receiver object of the most recently executed method test, the current class, and the result of the method test. The code then uses the acquired receiver object name and current class as keys to search the profile table 1424. If there is a matching entry, the code increments the value in the profiling count field of the entry by 1; if there is not a matching entry, the code adds a new entry having the name of the current receiver object in the receiver object field, the current class in the run-time class field, the result of the current method test in the test result field, and a value of 1 in the profiling count field. The code sequence 206 which has undergone the insertion process is returned to the code sequence storage 1420.

The optimization apparatus 210B then determines whether or not the code sequence 206 after the insertion process has been executed by the execution unit 220 or, if compiled by the compiler 208B, by the CPU 1 (step 1404). The determination at step 1404 is repeated until it is determined that the code sequence 206 has been executed. If the optimization apparatus 210B determines at step 1404 that the code sequence 206 has been executed (YES at step 1404), the optimization apparatus 210B attempts to acquire a profiling result (step 1406). The optimization apparatus 210B determines whether or not a profiling result has been successfully acquired (step 1408). If no profiling result has been acquired (NO at step 1408), the optimization apparatus 210B repeats the determination at step 1404.

On the other hand, if a profiling result has been acquired (YES at step 1408), the optimization apparatus 210B selects top m entries (m is an integer greater than or equal to 1) with high profiling counts from among the run-time classes having the test result "success" in the profile table 1424, for each of the receiver object contained in the code sequence 206 (step 1410). Similarly, the optimization apparatus 210B selects top n entries (n is an integer greater than or equal to 1) with high profiling counts from among the run-time classes with the test result "failure" in the profile table 1424, for each of the receiver objects contained in the code sequence 206 (step 1410).

The optimization apparatus 210B then reads the code sequence 206 which has undergone the insertion process at step 1402 from the code sequence storage 1420 and, for each class test, adds or updates classes to be permitted by using the run-time classes of the m entries selected as the "success" classes for corresponding receiver objects at step 1410 (step 1412). Similarly, for each class test, the optimization apparatus 210B adds or updates classes to be rejected by using the run-time classes of the n entries selected as "failure" classes for corresponding receiver object at step 1410 (step 1412). The code sequence 206 in which the virtual call guards have been optimized by adding or updating the classes to be permitted and/or classes to be rejected is then sent back to the code sequence storage 1420. Then the process returns to step 1404 and the process sequence from step 1404 to step 1412 is repeated on the code sequence 206 optimized at step 1412.

Figure 15:
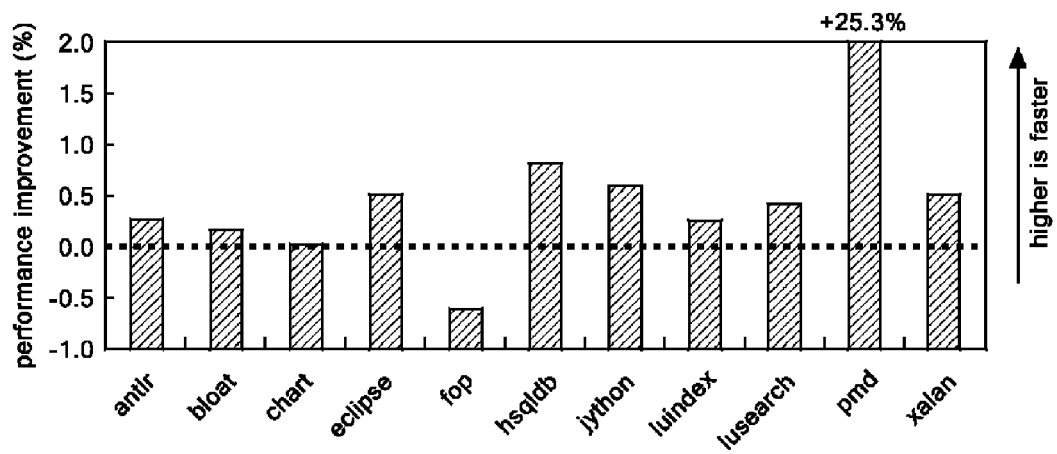
FIG. 15 is a diagram illustrating results of an experiment for comparison in performance between a conventional technique and the present invention (the first embodiment)
Figure 16:
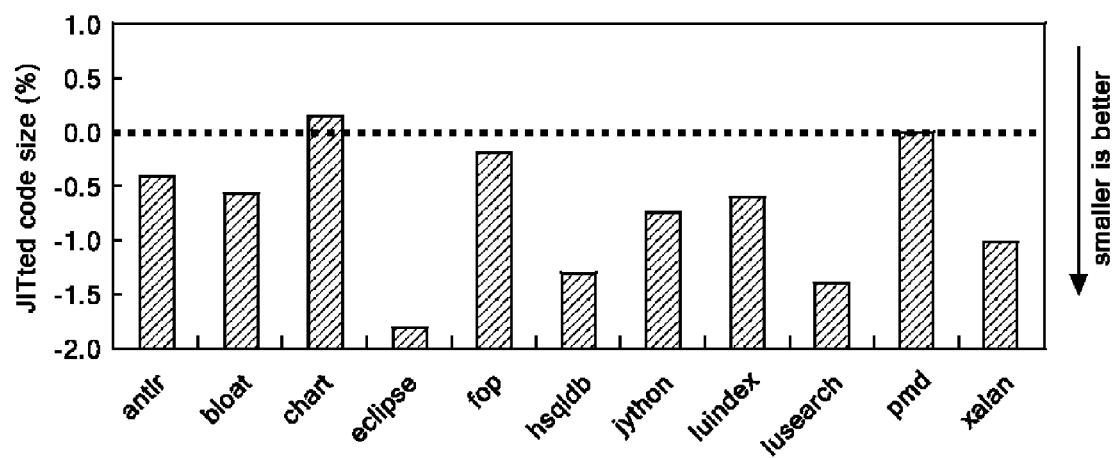
FIG. 16 is a diagram illustrating results of an experiment for comparison in code size between the conventional technique and the present invention (the first embodiment).

Performance improvement and code size reduction effects of the present invention will be investigated below with reference to FIGS. 15 and 16. The graphs in FIGS. 15 and 16 show results of an experiment for comparing in performance and code size achieved by a conventional technique that uses a class test that permits a only a class at the trace recording time as a virtual call guard and performance and code size achieved by using as a virtual call guard a class test that permits a plurality of classes obtained by using the optimization method according to the first embodiment of the present invention. The vertical axis in FIG. 15 represents performance improvement over the conventional technique and the horizontal axis indicates the program names of benchmarks in the DaCapo benchmark suite (Dacapo-2006-10-MR2). The vertical axis of FIG. 16 represents the ratio of the size of a code of the first embodiment to the size of a JIT-compiled code of the conventional technique and the horizontal axis indicates the program names in the DaCapo benchmark suite as in FIG. 15. The experiment used a computer including a POWER6 processor operating at 4.0 GHz and running the AIX 6.1 operating system. The experimental results are the averages of 16 runs and classes added as classes to be permitted are limited to top four classes. As shown in FIG. 15, the performance was improved in all benchmarks except the fop benchmark. A performance improvement of as large as 25% was achieved in the pmt benchmark. The size of the JIT-compiled code was reduced in all benchmarks except the chart benchmark.

While the present invention has been described with embodiments thereof, the technical scope of the present invention is not limited to the scope described with the embodiments. For example, while the present invention has been applied to a single-dispatch language in which a call target of a virtual method is determined by the class of a single object at execution time, the present invention is also applicable to a multi-dispatch language in which a call-target method can be selected according to the types of multiple arguments at execution time. In that case, in order to skip the second and subsequent virtual call guards, it is needed to propagate information indicating that a set of all objects that affect the determination of a call target have been checked. For example, even if type checking of a set of object A and object B and type checking of a set of object A and object C have been performed, type checking of the objects B and C cannot be skipped when objects B and C are used for a virtual method call. It will be apparent to those skilled in the art that various modifications or improvements can be made to the embodiments describe above. Therefore, such modified or improved embodiments are also fall within the technical scope of the present invention.

What is claimed is:

1. An optimization method for optimizing a code sequence by computer processing, the method comprising the steps of:
 (a) reading the code sequence to be compiled from a storage device and inserting a method test for each of the virtual methods included in the code sequence;
 (b) acquiring one or more profiled run-time classes of a receiver object used for calling each of the virtual methods at execution of the compiled code sequence after the insertion step; and
 (c) optimizing the code sequence by inserting, in place of the method test, a class test that sets, first, a recording-time class of a receiver object corresponding to each of the virtual methods included in the code sequence and, second, a run-time class in the acquired one or more profiled run-time classes as a class to be permitted for the class test, on condition that the run-time class of the corresponding receiver object has successfully called all virtual methods requesting the method test for the receiver object.

2. The optimization method according to claim 1, wherein if the number of classes to be permitted exceeds a predetermined threshold, the step (c) adds only a class that has been profiled more times among the plurality of classes as a class to be permitted.

3. The optimization method according to claim 2, wherein step (c) inserts the class test only for a virtual method that is executed first in the code sequence among a plurality of virtual methods that use the same receiver object and omits inserting the class test for the other virtual methods.

4. The optimization method according to claim 3, wherein the run-time class of the receiver object used for calling each of the virtual methods is profiled on condition that the run-time class has succeeded in all of the method tests inserted in the code sequence.

5. An optimization method for optimizing a code sequence by computer processing, the method comprising the steps of:
 (a) reading the code sequence to be compiled from a storage device and, for each of virtual methods included in the code sequence, inserting a class test that sets a recording-time class of a receiver object used for calling the virtual method as a class to be permitted and a method test which is executed on condition that the class test has failed;
 (b) acquiring one or more profiled run-time classes of a receiver object used for calling each of the virtual methods at execution of the compiled code sequence after the insertion step; and
 (c) optimizing the code sequence by adding a run-time class that is in the acquired one or more profiled run-time classes to a set of classes permitted by the corresponding class test on condition that the run-time class of a receiver object corresponding to each of the virtual methods included in the code sequence has successfully called all virtual methods requesting the method test for the receiver object.

6. The optimization method according to claim 5, wherein steps (b) and (c) are repeated for execution of the optimized code sequence.

7. The optimization method according to claim 6, wherein step (b) also acquires a profiled test result of the method test inserted for each virtual method and step (c) adds an run-time class of a receiver object used by a virtual method that has failed the method test as a class to be rejected.

8. The optimization method according to claim 7, wherein if the number of classes to be added as classes to be permitted or as classes to be rejected exceeds a predetermined threshold, step (c) adds only a class that has been profiled more times among the plurality of classes exceeding the predetermined threshold as a class to be permitted or a class to be rejected.

9. A non-transitory computer readable storage medium comprising a computer readable optimization program, wherein the computer readable optimization program when executed on a computer causes the computer to perform the steps of the optimization method according to claim 5.

10. An optimization apparatus optimizing a code sequence comprising:
 an insertion unit reading the code sequence to be compiled from a storage device and inserting a method test for each of virtual methods included in the code sequence;
 an acquisition unit acquiring one or more profiled run-time classes of a receiver object used for calling each of the virtual methods at execution of the compiled code sequence into which the method tests have been inserted; and
 an optimization unit comprising a processor configured to insert, in place of the method test, a class test that sets, first, a recording-time class of a receiver object corresponding to each of the virtual methods included in the code sequence and, second, a run-time class that is in the acquired one or more profiled run-time classes as a class to be permitted for the class test, on condition that the run-time class of the corresponding receiver object has successfully called all virtual methods requesting the method test for the receiver object.

11. The optimization apparatus according to claim 10, wherein if the number of classes to be permitted exceeds a predetermined threshold, the optimization unit adds only a class profiled more times among the plurality of classes exceeding the predetermined threshold as a class to be permitted.

12. The optimization apparatus according to claim 11, wherein the optimization unit inserts the class test only for a virtual method that is executed first in the code sequence among a plurality of virtual methods that use the same receiver object and omits inserting the class test for the other virtual methods.

13. An optimization apparatus optimizing a code sequence comprising:
 an insertion unit reading the code sequence to be compiled from a storage device and, for each of virtual methods included in the code sequence, inserting a class test that sets a recording-time class of a receiver object used for calling the virtual method as a class to be permitted and a method test which is executed on condition that the class test has failed;
 an acquisition unit acquiring one or more profiled run-time classes of a receiver object used for calling each of the virtual methods at execution of the compiled code sequence after the insertion step; and
 an optimization unit comprising a processor configured to optimize the code sequence by adding a run-time class that is in the acquired one or more profiled run-time classes to a set of classes permitted by the corresponding class test on condition that the run-time class of a receiver object corresponding to each of the virtual methods included in the code sequence has successfully called all virtual methods requesting the method test for the receiver object.

14. The optimization apparatus according to claim 13, wherein the processing by the acquisition unit and the optimization unit is repeated for execution of the optimized code sequence.

15. The optimization apparatus according to claim 14, wherein if the acquired run-time class of a receiver object has failed to call any of virtual methods requesting the method test for the receiver object, the optimization unit adds the failed run-time class of the receiver object to a corresponding class test as a class to be rejected.

16. The optimization apparatus according to claim 15, wherein if the number of classes to be added as classes to be permitted or as classes to be rejected in the class test exceeds a predetermined threshold, the optimization unit adds only a class that has been profiled more times among the plurality of classes exceeding the predetermined threshold as a class to be permitted or a class to be rejected.

* * * * *